(12) United States Patent
Mori et al.

(10) Patent No.: US 11,441,905 B2
(45) Date of Patent: Sep. 13, 2022

(54) INERTIAL NAVIGATION DEVICE AND INERTIAL NAVIGATION METHOD

(71) Applicant: KABUSHIKI KAISHA TOYOTA CHUO KENKYUSHO, Nagakute (JP)

(72) Inventors: Daiki Mori, Nagakute (JP); Yoshikazu Hattori, Nagakute (JP); Hideki Sugiura, Nagakute (JP); Hiroyuki Yamaguchi, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 178 days.

(21) Appl. No.: 16/731,211

(22) Filed: Dec. 31, 2019

(65) Prior Publication Data

US 2020/0318971 A1 Oct. 8, 2020

(30) Foreign Application Priority Data

Apr. 2, 2019 (JP) .............................. JP2019-070877

(51) Int. Cl.
| | | |
|---|---|---|
| G01C 21/16 | (2006.01) |
| G05D 1/02 | (2020.01) |
| B60W 40/076 | (2012.01) |
| B60W 30/04 | (2006.01) |
| G05D 1/08 | (2006.01) |

(52) U.S. Cl.
CPC .............. *G01C 21/16* (2013.01); *B60W 30/04* (2013.01); *B60W 40/076* (2013.01); *G05D 1/027* (2013.01); *G05D 1/0891* (2013.01)

(58) Field of Classification Search
CPC ...... G01C 21/16; G01C 21/165; G05D 1/027; G05D 1/0891; B60W 40/076; B60W 30/04
See application file for complete search history.

(56) References Cited

U.S. PATENT DOCUMENTS

2008/0059034 A1* 3/2008 Lu ...................... B60T 8/17552
701/71

FOREIGN PATENT DOCUMENTS

| JP | H06-317428 A | 11/1994 |
| JP | 2011-122921 A | 6/2011 |
| JP | 2018-155731 A | 10/2018 |

* cited by examiner

*Primary Examiner* — Yuen Wong
(74) *Attorney, Agent, or Firm* — Oliff PLC

(57) ABSTRACT

An inertial navigation device that includes a processor that is configured to: assume a vertical velocity and a lateral velocity of a vehicle to be 0, and estimate a roll angle, a pitch angle and an azimuth angle, which are attitude angles of the vehicle, based on angular velocities and accelerations detected by the inertial measurement device, a longitudinal velocity detected by a vehicle velocity sensor, and an initial value of the azimuth angle of the vehicle, and assume the vertical velocity of the vehicle to be 0, and estimate a current position of the vehicle based on the estimated attitude angles, the angular velocities and the accelerations detected by the inertial measurement device, the longitudinal velocity detected by the vehicle velocity sensor, a steering angle detected by a steering angle sensor, and an initial value of a position of the vehicle.

14 Claims, 11 Drawing Sheets

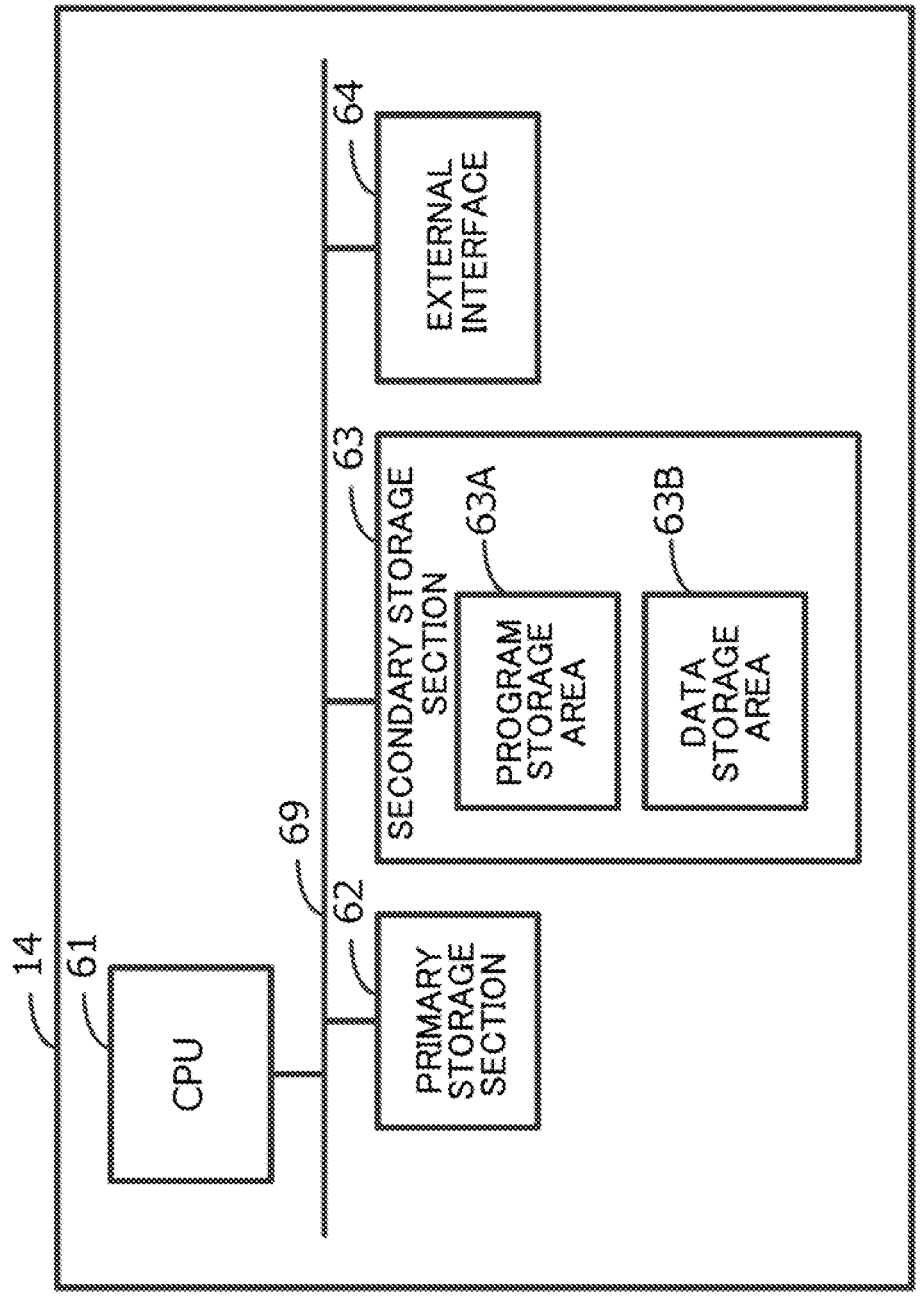

INERTIAL NAVIGATION DEVICE AND INERTIAL NAVIGATION METHOD

CROSS-REFERENCE TO RELATED APPLICATION

This application is based on and claims priority under 35 USC 119 from Japanese Patent Application No. 2019-070877 filed on Apr. 2, 2019, the disclosure of which is incorporated by reference herein.

BACKGROUND

Technical Field

The present disclosure relates to an inertial navigation device and an inertial navigation method.

Related Art

Information relating to the attitude angles and the position of a vehicle is information that is of the utmost importance in driving assist technologies and preventive safety technologies. For example, the roll angle and the pitch angle of the vehicle body can be employed at the time of determining control inputs (steering angle, acceleration and braking) that compensate for gravitational acceleration components, and more stable control of the vehicle is possible. Moreover, position estimation is essential in position control of the vehicle.

In particular, in current autonomous driving technologies, information of external sensors that sense the situation of other than the vehicle (the external situation), such as a GPS (Global Positioning System) and LIDAR (Laser Imaging Detection and Ranging) and the like, is essential at the time of estimating the position of the own vehicle. Inertial navigation (dead reckoning) is becoming an important technique as a failsafe for times when such external sensors no longer function.

Dead reckoning is an inertial navigation method that estimates the position of the own vehicle on the basis of accumulation of movement amounts of the own vehicle that are detected by internal sensors that sense the state of the vehicle itself, such as the IMU (Inertial Measurement Unit), the vehicle velocity sensor, the steering angle sensor and the like that do not directly detect the position of the own vehicle but can detect angular velocities of three axes (pitch rate, roll rate and yaw rate) and accelerations of three axes (longitudinal acceleration, lateral acceleration and vertical acceleration) that express the behavior of the vehicle at the time of traveling.

The accuracy of the external sensors is greatly influenced by the external environment, such as rain, fog, nighttime and backlight. If information from the external sensors deteriorates, autonomous driving is stopped, and control of the driving is handed-over from the autonomous driving system to the driver. However, during the time until control is handed over from the autonomous driving system to the driver, it is required that the autonomous driving be continued for a given time by using only the internal sensors.

Japanese Patent Application Laid-Open (JP-A) No. 2018-155731 discloses an own position estimating device that estimates the position of the own vehicle on the basis of GPS, recognition of white lines, recognition of the peripheral environment, road shape and map information.

JP-A No. 6-317428 discloses an inertial navigation method that, from differences in the outputs of the GPS and the IMU, estimates respective error amounts, and improves the accuracy of estimating the position of the own vehicle and the azimuth of the own vehicle.

JP-A No. 2011-122921 discloses a device that highly accurately estimates a vehicle motion model at times when highly accurate GPS information can be acquired from GPS satellites.

However, the device disclosed in JP-A No. 2018-155731 necessitates input of much information. If even just some of the inputted information deteriorates or is missing, the accuracy of estimating the own position deteriorates, and there is the concern that the control that keeps the own vehicle within a lane during autonomous driving will become difficult.

In the method disclosed in JP-A No. 6-317428, highly-accurate GPS information is needed in order to carry out IMU error estimation with high accuracy. However, there is the problem that, currently, there are few such services. Further, it is assumed that the IMU that is used is a highly accurate IMU that is used in airplanes and ships. With IMUs that are mass-produced by MEMS (Micro Electro Mechanical Systems), an equivalent performance cannot be obtained even if the same algorithms are used, and there is the problem that the estimated values of the position are unstable.

In the device disclosed in JP-A No. 2011-122921, highly-accurate GPS information is needed in identifying the vehicle motion model, and there is the problem that costs increase if, for example, three GPS antennas are installed in order to obtain highly-accurate GPS information. Moreover, there is no clear discussion of a reference point for the time of estimating the slip angle, and there is the concern that the side slipping model will fail due to the placement of the reference point.

SUMMARY

An aspect of the present disclosure is an inertial navigation device that includes: an inertial measurement device that can detect angular velocities and accelerations that express behavior of a vehicle at a time of traveling; a vehicle velocity sensor that detects a longitudinal velocity of the vehicle; a steering angle sensor that detects a steering angle of the vehicle; and a processor that is configured to: assume a vertical velocity and a lateral velocity of the vehicle to be 0, and estimate a roll angle, a pitch angle and an azimuth angle, which are attitude angles of the vehicle, based on the angular velocities detected by the inertial measurement device, the accelerations detected by the inertial measurement device, the longitudinal velocity detected by the vehicle velocity sensor, and an initial value of the azimuth angle of the vehicle, and assume the vertical velocity of the vehicle to be 0, and estimate a current position of the vehicle based on the estimated attitude angles, the angular velocities detected by the inertial measurement device, the accelerations detected by the inertial measurement device, the longitudinal velocity detected by the vehicle velocity sensor, the steering angle detected by the steering angle sensor, and an initial value of a position of the vehicle.

BRIEF DESCRIPTION OF THE DRAWINGS

FIG. 11 is a block drawing showing an example of hardware structures of the calculation unit.

DETAILED DESCRIPTION

Figure 1:
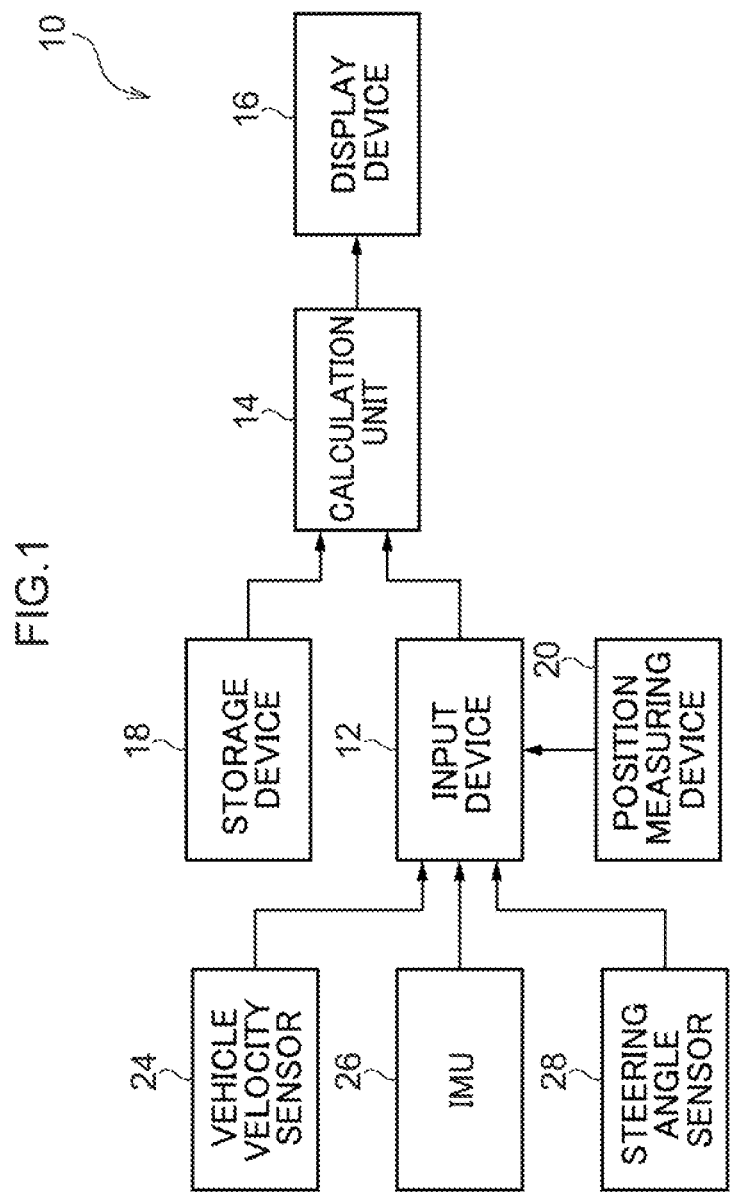
FIG. 1 is a block drawing showing an example of an inertial navigation device relating to an embodiment.

An embodiment is described in detail hereinafter with reference to the drawings. As shown in FIG. 1, an inertial navigation device 10 relating to the present embodiment is structured by: a storage device 18 that stores data needed for computation of a calculation unit 14 that is described later and the results of computation by the calculation unit 14; a position measuring device 20 that computes the current position and the current yaw angle (azimuth angle) of the vehicle from information on the periphery of the vehicle that is acquired by external sensors such as sensing devices and GPS and the like that the vehicle is equipped with; an input device 12 to which are inputted the current position and the current yaw angle of the vehicle that are computed by the position measuring device 20, the vehicle longitudinal velocity that a vehicle velocity sensor 24 detects, the deviation of the azimuth angle and accelerations of the vehicle that an IMU 26 detects, and the steering angle of the vehicle that a steering angle sensor detects; the calculation unit 14 that is structured by a computer or the like that carries out the computation of estimation of the vehicle position on the basis of input data inputted from the input device 12 and data stored in the storage device 18; and a display device 16 that is structured by a CRT or an LCD or the like and displays the position of the vehicle and the like that are computed by the calculation unit 14.

The sensing devices that are the external sensors relating to the present embodiment are, as an example, any of an imaging device such as an onboard camera or the like, LIDAR (Light Detection and Ranging), and sonar. In a case in which an imaging device such as an onboard camera the like is used as the onboard sensing device, as an example, image information of the periphery of the vehicle that is acquired by the imaging device is analyzed, and the white lines on the road and the like are detected. In a case in which LIDAR is used as the onboard sensing device, as an example, the white lines on the road and the like are detected from scattered light of pulse laser that is illuminated onto the vehicle periphery. In a case in which sonar is used as the onboard sensing device, as an example, the difference between the reflection rates of the ultrasonic waves of the road surface that is asphalt and the white lines painted thereon is utilized so as to identify the white lines.

Figure 2:
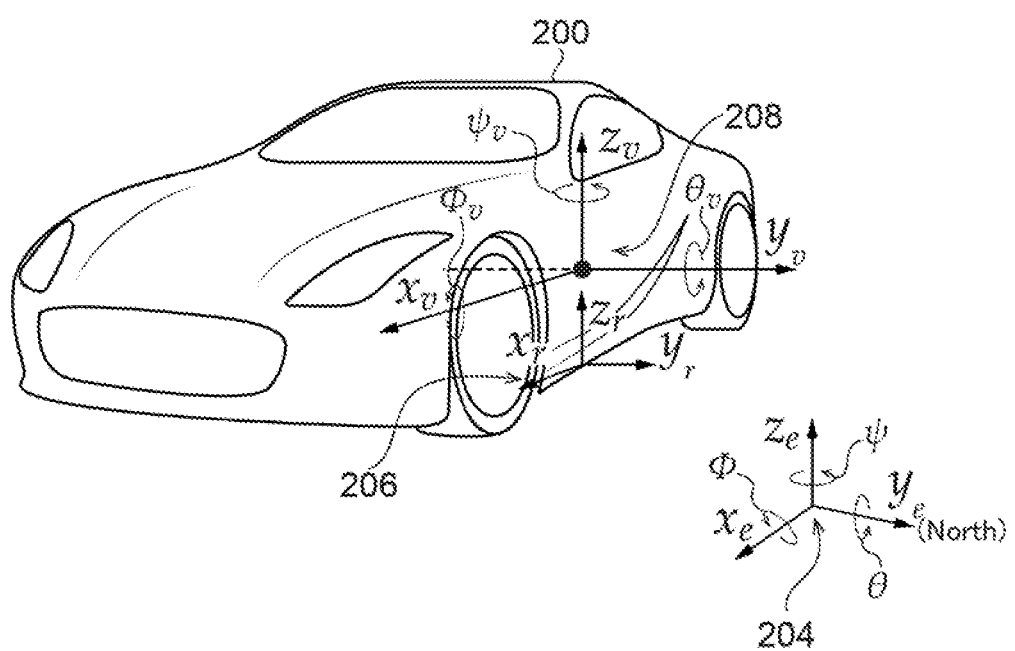
FIG. 2 is a schematic drawing showing coordinate systems in the embodiment.

Next, the coordinate systems relating to the behavior of a vehicle 200 are defined as shown in FIG. 2. A geographic coordinate system 204 is a coordinate system in which, with a planar surface of the earth as a reference, the gravitational acceleration direction and ze are parallel, and $y_e$ is directed north. Road surface coordinate system 206 is a coordinate system in which $z_r$ passes through the center of gravity of the vehicle 200 and is directed in a direction orthogonal to the road surface, and $x_r$ is directed in the vehicle advancing direction. Vehicle body coordinate system 208 is a coordinate system that is fixed on a vehicle body spring, and $z_v$ is directed in the vehicle body vertically upward direction, and $x_v$ is directed in the vehicle body advancing direction. Accordingly, the longitudinal direction of the vehicle 200 is a direction parallel to the x-axis of the vehicle body coordinate system 208. As described later, in the present embodiment, the reference point of the vehicle body coordinate system 208 is not the center of gravity of the vehicle 200, and is the vehicle transverse direction center of the axle of the rear wheels of the vehicle 200.

Further, roll angle $\phi$, pitch angle $\theta$ and yaw angle $\psi$, which are the Euler attitude angles, are defined as shown in FIG. 2 with respect to the geographic coordinate system 204. For example, the roll angle $\phi$ is the rotation angle around the x-axis, the pitch angle $\theta$ is the rotation angle around the y-axis, and the yaw angle $\psi$ is the rotation angle around the z-axis. Further, the roll angle $\phi$, the pitch angle $\theta$ and the yaw angle $\psi$ are respectively positive values in rotation in a right screw direction (in the directions of the respective arrows in FIG. 2). In the present embodiment, for convenience, yaw angle deviation that is described later has the road surface coordinate system 206 as the reference coordinate system thereof, and, moreover, the Euler attitude angles that are originally defined with respect to the geographic coordinate axis 204 are defined as the roll angle $\phi_v$, the pitch angle $\theta_v$ and the yaw angle $\psi_v$ with respect to the vehicle body coordinate axis 208. Hereinafter, when merely the roll angle $\phi$, the pitch angle $\theta$ and the yaw angle $\psi$ are used, they basically mean the attitude angles that are defined with respect to the vehicle body coordinate system 208.

Figure 3:
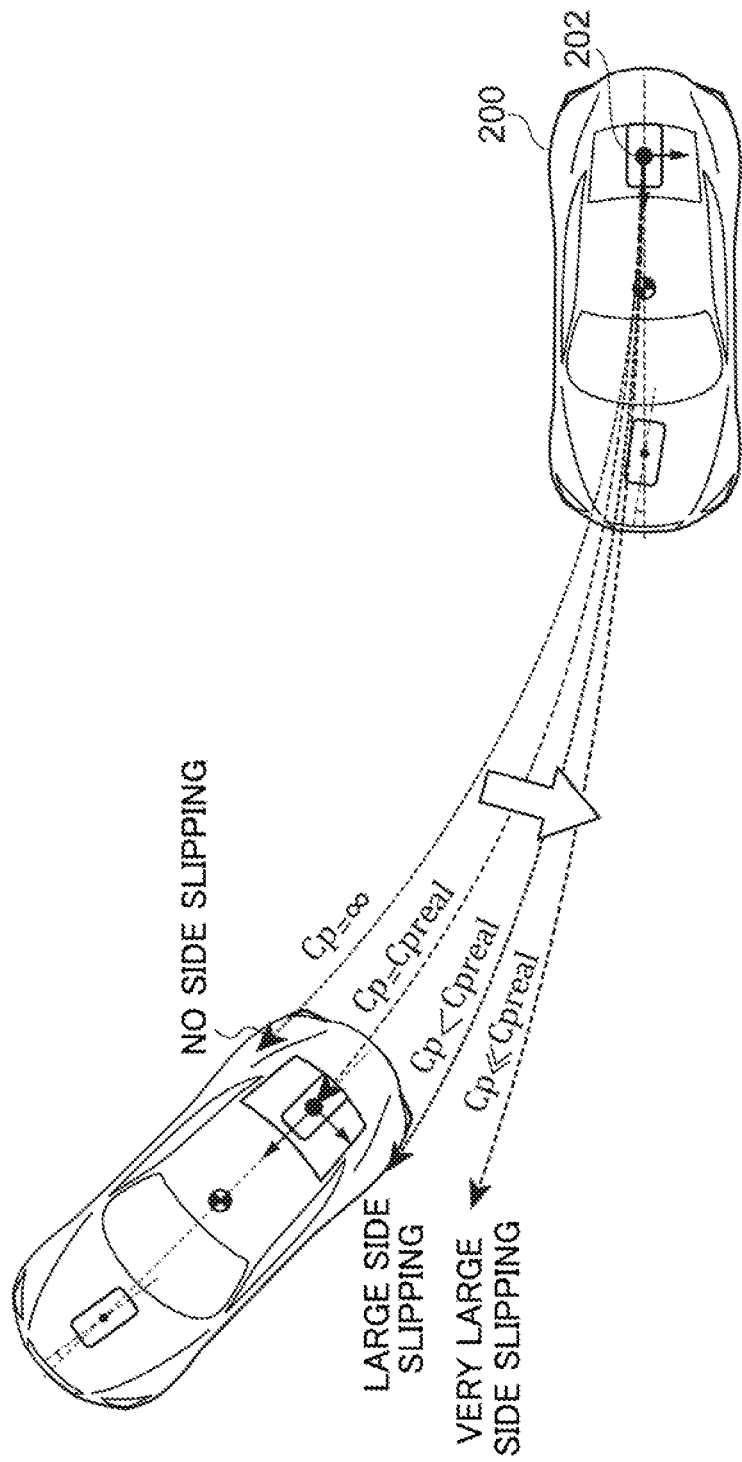
FIG. 3 is an explanatory drawing showing loci of a rear wheel axle center of the vehicle during turning, in correspondence with magnitudes of cornering stiffness.

FIG. 3 is a drawing showing loci of a rear wheel axle center 202 of the vehicle 200 that is in the midst of turning, in correspondence with magnitudes of cornering stiffness Cp. Side slipping of the vehicle 200 varies in accordance with the value of the cornering stiffness Cp. For example, if Cp is infinitely large, side slipping does not arise at the vehicle 200 during turning. However, in actuality, the vehicle 200 not side-slipping during turning is impossible. As shown in FIG. 3, given that the Cp in a case in which the vehicle 200 turns while giving rise to side slipping in actuality is $Cp_{real}$, if Cp is smaller than $Cp_{real}$, the side slipping is large, and, if Cp becomes even smaller, the side slipping becomes extremely large.

Further, in the side slipping model shown in FIG. 3, as an example, the center 202 in the vehicle transverse direction of the rear wheel axle of the vehicle 200 (hereinafter called "rear wheel axle center 202") is the reference point for the side slipping estimation of the vehicle 200.

Generally, in lateral velocity estimation that is needed at the time of carrying out position estimation, lateral velocity estimation is carried out many times in a vehicle motion model whose reference is the center of gravity position of the vehicle. However, if the center of gravity position of the vehicle is used as the reference, the direction of the side slipping varies greatly in accordance with the vehicle velocity (longitudinal velocity) even if the turning direction is the same, and there is the concern that the position estimation will deteriorate more than in a case in which side slipping is not taken into consideration.

In the present embodiment, the left-right direction of side slipping can be estimated correctly by utilizing a vehicle motion model whose reference is a position at which the lateral velocity is always in the outward direction of the turn. In addition to setting such a reference point, by correctly estimating the magnitude of the side slipping, the position of the vehicle 200 can be estimated highly accurately regardless of the vehicle velocity.

In detail, a position at which the lateral velocity is always in the outward direction of the turn is, as shown in FIG. 3, the rear wheel axle in the case of the vehicle 200 that does not have a rear wheel steering function. Accordingly, in the present embodiment, the rear wheel axle center 202 of the vehicle 200 is made to be the reference point of the side slipping estimation. Even at vehicles that have a larger number of wheels than usual, such as trucks or the like, similarly, the vehicle transverse direction center of the axle that does not have a steering function is made to be the reference point of the side slipping estimation. Cp and the behavior of the vehicle 200 will be discussed again in the explanation of a position estimating section 50 that is described later.

Figure 4:
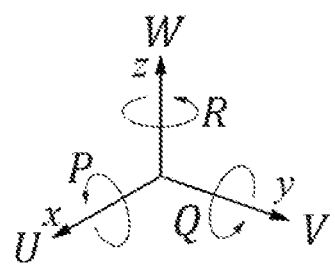
FIG. 4 is an explanatory drawing showing examples of variables in the embodiment.

FIG. 4 is an explanatory drawing showing an example of variables in the present embodiment. In the present embodiment, longitudinal velocity U of the vehicle 200, lateral velocity V of the vehicle 200, and vertical velocity W of the vehicle 200 are respectively defined. U is parallel to the x-axis, V is parallel to the y-axis, and W is parallel to the z-axis.

Further, the output values of the IMU 26 that correspond to the roll angle $\phi$, the pitch angle $\theta$ and the yaw angle $\psi$ of the vehicle 200 are defined as roll rate P, pitch rate Q and yaw rate R that are angular velocities.

In a case in which the accuracy of the IMU 26 or the gyro sensor or the like is insufficient, a vehicle motion model is utilized also in estimating the yaw rate R. However, in recent years, the accuracy of MEMS gyros that are used in inexpensive IMUs 26 has improved, and correction of the yaw rate R in particular has been facilitated by installing plural sensors, such as a vehicle velocity sensor and a steering angle sensor and the like, in the vehicle 200.

In the present embodiment, the yaw rate of a vehicle motion model is not used, and the value of the yaw rate R that is detected by the IMU 26 is corrected and used as is described hereafter. Further, because the vehicle body coordinate system 208 is not always made to be the reference, the roll rate P and the pitch rate Q that the IMU 26 detects are corrected and used as described hereafter.

Figure 5A:
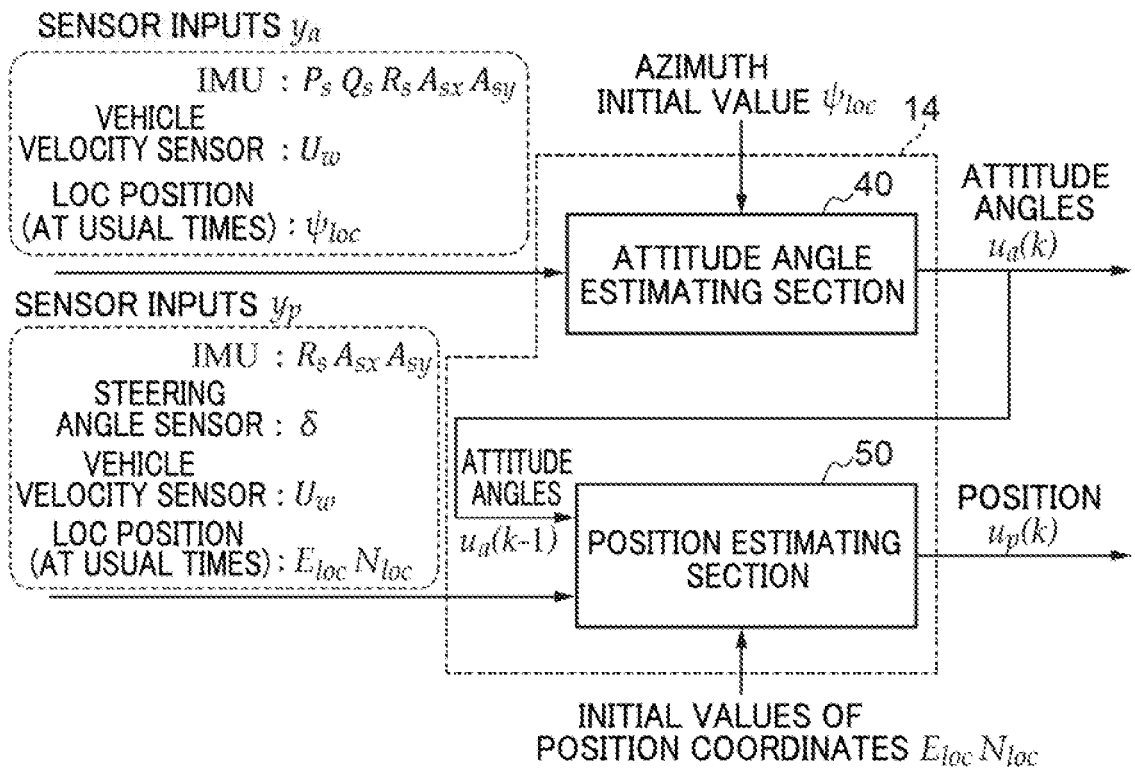
FIG. 5A is a schematic drawing showing an example of inputs and outputs of a calculation unit in a case in which measurement of the own position by external sensors is possible.
Figure 5B:
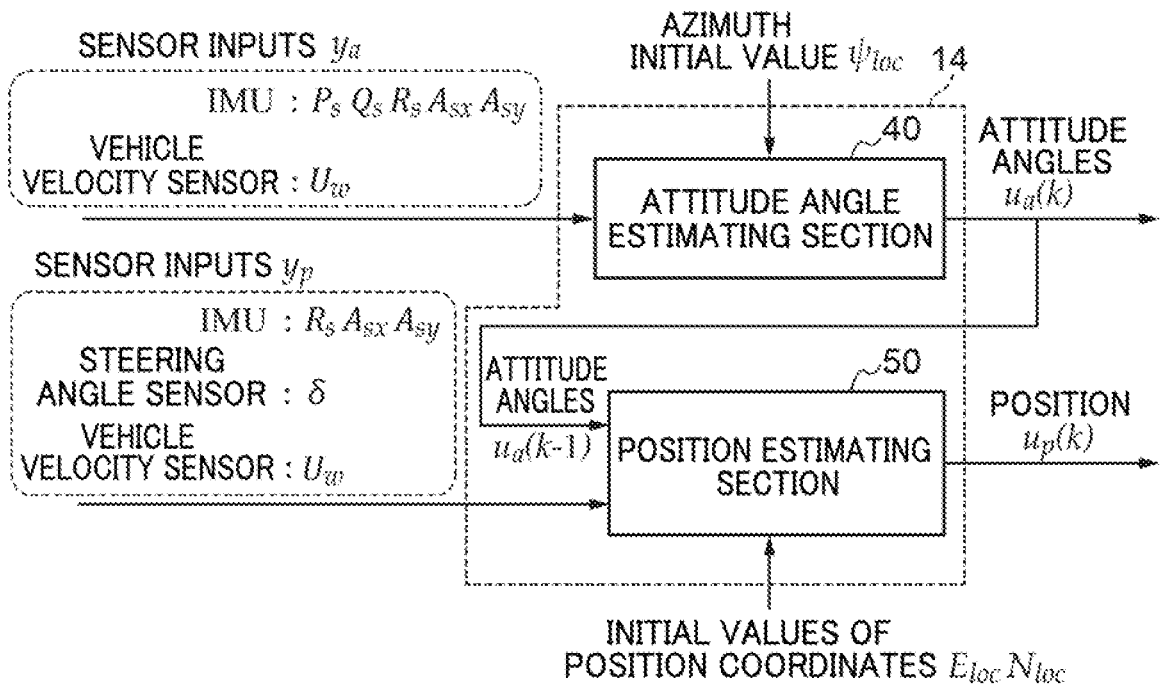
FIG. 5B is a schematic drawing showing an example of inputs and outputs of the calculation unit in a case in which measurement of the own position by external sensors is not possible.

FIG. 5A is a schematic drawing showing an example of the inputs and outputs of the calculation unit 14 in a case in which measurement of the own position by external sensors is possible. FIG. 5B is a schematic drawing showing an example of the inputs and outputs of the calculation unit 14 in a case in which measurement of the own position by external sensors is not possible.

As shown in FIG. 5A and FIG. 5B, the calculation unit 14 includes an attitude angle estimating section 40 that estimates the attitude angles of the vehicle 200 on the basis of sensor input $y_a$, and the position estimating section 50 that estimates the position of the vehicle 200 on the basis of sensor input $y_p$.

As shown in FIG. 5A, in a case in which measurement of the own position is possible, roll rate $P_s$, pitch rate $Q_s$, yaw rate $R_s$, longitudinal acceleration $A_{sx}$ in the advancing direction (the x-axis direction) of the vehicle 200, and lateral acceleration $A_{sy}$ that is acceleration in the lateral direction (the y-axis direction) of the vehicle 200 are inputted to the attitude angle estimating section 40 from the IMU 26 that is an internal sensor. Note that the subscript s of the respective input values from the IMU 26 is an abbreviation for sensor.

Further, longitudinal velocity $U_w$ of the vehicle 200 is inputted from the vehicle velocity sensor 24 that is an internal sensor.

Current yaw angle $\psi_{loc}$ of the vehicle 200 is inputted as the current position (LOC position) to the attitude angle estimating section 40 from an external sensor. The yaw angle $\psi_{loc}$ is used as the initial azimuth value at the attitude angle estimating section 40.

The attitude angle estimating section 40 estimates attitude angles $u_a(k)$ of the vehicle 200 on the basis of the sensor inputs $y_a$ that are inputted from internal sensors and external sensors.

The position estimating section 50 estimates the position of the vehicle 200 on the basis of attitude angles $u_a(k-1)$, that are estimated by the attitude angle estimating section 40, and the sensor inputs $y_p$.

Inputted to the position estimating section 50 as the sensor inputs $y_p$ are the yaw rate $R_s$, the longitudinal acceleration $A_{sx}$ and the lateral acceleration $A_{sy}$ that are from the IMU 26 that is an internal sensor, the steering angle $\delta$ from a steering angle sensor 28 that is an internal sensor, the longitudinal velocity $U_w$ from the vehicle velocity sensor 24 that is an internal sensor, and EN coordinates ($E_{loc}$, $N_{loc}$) as the LOC position from an external sensor. In the geographical coordinate system 204, the EN coordinates express the relative position to the vehicle 200 from a geographical point that is a reference. $E_{loc}$ expresses the longitude direction position from that geographical point in meters, and $N_{loc}$ expresses the latitude direction position from that geographical point in meters. The position estimating section 50 estimates the position of the vehicle 200 on the basis of the above inputs.

FIG. 5B is a case in which input from external sensors is disrupted, and measurement of the own position by using the external sensors is not possible. In such a case, the inertial navigation device 10 relating to the present embodiment estimates the attitude angles and the position of the vehicle 200 on the basis of inputs from the IMU 26, the vehicle velocity sensor 24 and the steering angle sensor 28 that are internal sensors.

Figure 6:
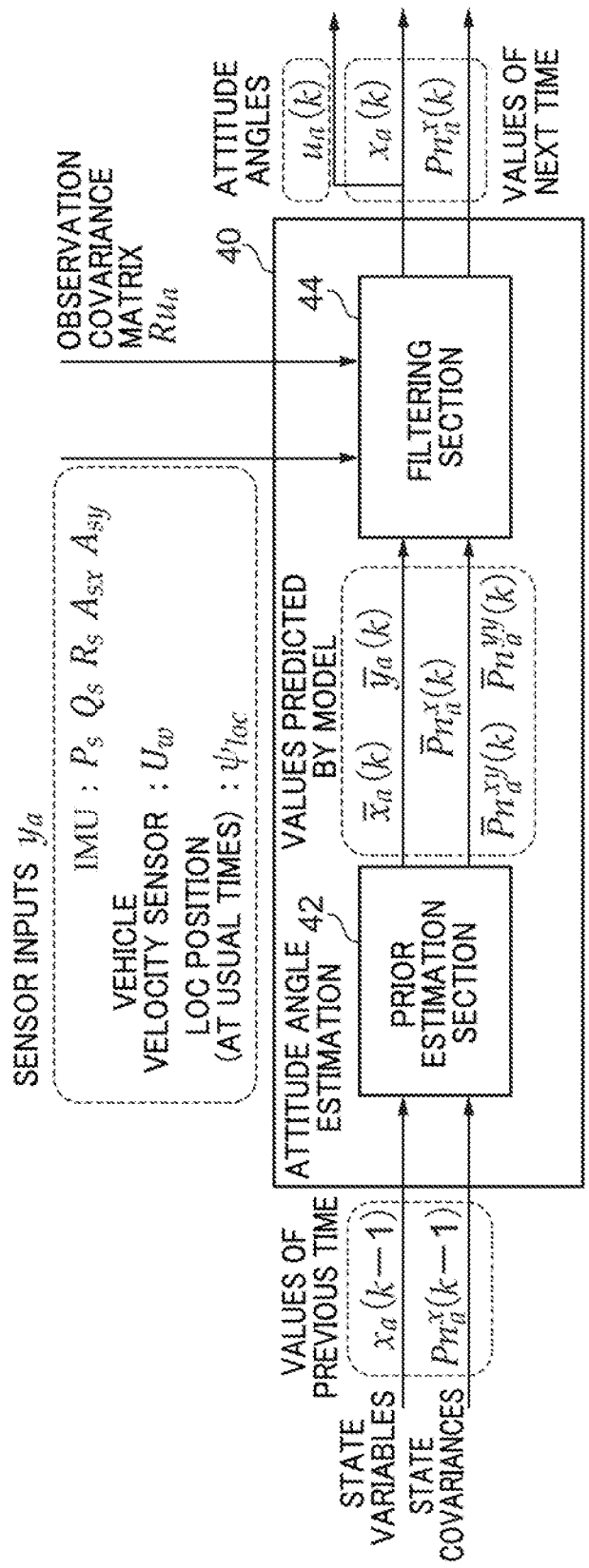
FIG. 6 is an example of a functional block drawing of an attitude angle estimating section relating to the embodiment.

FIG. 6 is an example of a functional block drawing of the attitude angle estimating section 40 relating to the present embodiment. As shown in FIG. 6, the attitude angle estimating section 40 includes a prior estimation section 42, which estimates predicted values (prior estimated values) on the basis of a side slipping model from last time values $x_a(k-1)$ of state variables and last time values $Pn_a^x(k-1)$ of state covariances that are described later, and a filtering section 44, which, by using the sensor inputs $y_a$ and an observation covariance matrix $Rn_a$ that is described later, corrects the prior estimated values that are outputted from the prior estimation section 42, and outputs next time values $x_a(k)$ of the state variables, next time values $Pn_a^x(k)$ of the state covariances, and the attitude angles $u_a(k)$.

Note that the subscript a of the state variables, the state covariances, the observation covariance matrix and the attitude angles is the abbreviation for angle.

The processing at the attitude angle estimating section 40 is described next. In the present embodiment, the angular velocities of the attitude angles, which are the rates of change in the attitude angles of the vehicle 200, are defined by following formula (1).

$$\begin{bmatrix} \dot{\phi}_v \\ \dot{\theta}_v \\ \dot{\psi}_v \end{bmatrix} = \begin{bmatrix} 1 & \sin\phi_v \tan\theta_v & \cos\phi_v \tan\theta_v \\ 0 & \cos\phi_v & -\sin\phi_v \\ 0 & \sin\phi_v/\cos\theta_v & \cos\phi_v/\cos\theta_v \end{bmatrix} \begin{bmatrix} P_v \\ Q_v \\ R_v \end{bmatrix} \quad (1)$$

The accelerations along the respective axes that are obtained by the IMU 26 are expressed by the following formula, on the basis of above formula (1) and gravitational acceleration g. Note that the following formula includes respective variables that are the roll rate P, the pitch rate Q and the yaw rate R that are detected by the IMU 26, and the longitudinal velocity U, the lateral velocity V and the vertical velocity W that are detected by the vehicle velocity sensor 24.

$$\begin{cases} A_x = \dot{U} + QW - RV - g\sin\theta_v \\ A_y = \dot{V} + RU - PW + g\sin\phi_v \cos\theta_v \\ A_z = \dot{W} + PV - QU + g\cos\phi_v \cos\theta_v \end{cases}$$

In the present embodiment, vertical acceleration $A_z$ is not considered. Further, if it assumed that the lateral velocity V and the vertical velocity W of the vehicle 200 are sufficiently small, the above formula can be approximated as the following formula.

In a general estimating method that uses an inertial sensor (IMU), position estimation is carried out while, by using the position information detected by the GPS, correcting the angular velocities of the three axes that are detected by the gyro sensor of the IMU (the roll rate P, the pitch rate Q, the yaw rate R) and the accelerations of the three axes that are detected by the acceleration sensor of the IMU (the longitudinal acceleration $A_x$, the lateral acceleration $A_y$, the vertical acceleration $A_z$). In this own position estimating method, position estimation is carried out while estimating all of the output errors of the inertial sensors and the errors of the GPS, and therefore, there is the concern that, if an inexpensive IMU is used, the estimation will not be stable, and the position information will greatly deteriorate.

At a rigid body such as the vehicle 200 or the like, generally, motion having six degrees of freedom, which are longitudinal velocity, lateral velocity, vertical velocity, roll, pitch and yaw, is carried out. However, in the present embodiment, because the vehicle 200 is traveling on a road surface, the vertical velocity and the lateral velocity are considered to be small, and the respective estimations are carried out while reducing the number of dimensions such that, as an example, the attitude angle estimation has four degrees of freedom (assuming that the vertical velocity=the lateral velocity=0) and the position estimation that is described later has five degrees of freedom (assuming that the vertical velocity=0). Due thereto, even in a case in which the IMU 26 that is an inertial sensor deteriorates, stable attitude angle estimation and position estimation are carried out.

$$\begin{cases} A_x = \dot{U} - g\sin\theta_v \\ A_y = RU + g\sin\phi_v \cos\theta_v \end{cases}$$

In the above formula, the unknowns that cannot be directly measured by sensors are only the roll angle $\phi_v$ and the pitch angle $\theta_v$ that are attitude angles with respect to the vehicle body coordinate system 208.

In the present embodiment, state equation f(x) is defined on the basis of above formula (1), and is used in the steps of prior estimation and filtering at the attitude angle estimating section 40. Details of the prior estimation and filtering steps are described later.

In the present embodiment, state variables $x_a$ are defined as follows.

$$x_a = [U_v, \dot{U}_v, \phi_v, \theta_v, \psi_v, P_v, Q_v, R_v]^T$$

Further, the state equation is defined as per following formula (2).

$$\dot{x}_a = f_a'(x_a) \quad (2)$$

For the above state amounts x(t), the state equation f(x), by which the relationship of above formula (2) is established, is established as follows.

$$\frac{dU_v}{dt} = \dot{U}_v + v_{U_v}$$

$$\frac{d\dot{U}_v}{dt} = v_{\dot{U}_v}$$

$$\frac{d\phi_v}{dt} = P_v + Q_v \sin\phi_v \tan\theta_v + R_v \cos\phi_v \tan\theta_v + v_{\phi_v}$$

$$\frac{d\theta_v}{dt} = Q_v \cos\phi_v - R_v \sin\phi_v + v_{\theta_v}$$

$$\frac{d\psi_v}{dt} = Q_v \sin\phi_v/\cos\theta_v + R_v \cos\phi_v/\cos\theta_v + v_{\psi_v}$$

$$\frac{dP_v}{dt} = v_{P_v}$$

$$\frac{dQ_v}{dt} = v_{Q_v}$$

$$\frac{dR_v}{dt} = v_{R_v}$$

Further, in the present embodiment, the error covariance matrix of the state equation is defined as follows.

$$Qn_a = \text{diag}(v_{U_v}, v_{\dot{U}_v}, v_{\phi_v}, v_{\theta_v}, v_{\psi_v}, v_{P_v}, v_{Q_v}, v_{R_v})$$

The roll rate $P_v$, the pitch rate $Q_v$ and the yaw rate $R_v$ that are included in the state equation are made to be a random walk model that is driven by white noise such that the next time values emerge randomly. A Markov model, which models a system in which the roll rate $P_v$, the pitch rate $Q_v$ and the yaw rate $R_v$ vary irregularly, may be employed.

The Kalman filter that is described hereafter discretizes and uses the above differential equation, which relates to the state equation $f_a(x_a)$, by using simple integration or the Runge-Kutta method. Accordingly, the input/output relationship of function $f_a(x_a)$ is used in a form in which $x_a(k) = f_a(x(k-1))$ for time t=k, k−1.

Next, the observed variables (observed amounts) by the sensors are defined as follows.

$$y_a = [U_w, P_s, Q_s, R_s, A_{sx}, A_{sy}, \psi_{loc}]^T$$

Observation equation $h_a(x_a)$ that satisfies $y_a = h_a(x_a)$ defines the correspondence between the state amounts (the right sides) and the observed amounts (the left sides) as per the following respective formulas.

$$U_w = U_v + \sigma_{U_w}$$

$$P_s = P_v + \sigma_{P_s}$$

$$Q_s = Q_v + \sigma_{Q_s}$$

$$R_s = R_v + \sigma_{R_s}$$

$$A_{sx} = \dot{U}_v - g \sin \theta_v + \sigma_{A_{sx}}$$

$$A_{sy} = R_v U_v + g \sin \phi_v \cos \theta_v + \sigma_{A_{sy}}$$

$$\psi_{loc} = \psi_v + \sigma_{\psi_{loc}}$$

The error covariance matrix of the observation equation is defined as follows.

$$R_{Na} = \text{diag}(\sigma_{U_w} \sigma_{P_s} \sigma_{Q_s} \sigma_{R_s} \sigma_{A_{sx}} \sigma_{A_{sy}} \sigma_{\psi_{loc}})$$

Because the error covariance matrix is the error covariance matrix of the observation equation, the uncertainties of the observation equation and noise of the sensors are also included therein. Further, in the present embodiment, because $\psi_{loc}$ cannot be acquired in an inertial navigation method that cannot use external sensors, the observed variables are changed as follows.

$$y_a' = [U_w\, P_s\, Q_s\, R_s\, A_{sx}\, A_{sy}]^T$$

It suffices to use an observation equation that excludes a formula relating to the yaw angle $\psi$ that is the vehicle body azimuth angle. Note that there is no need to carry out initialization of the covariance matrix of the state variables at usual times and at times of using the inertial navigation method, and it suffices to merely change the observation equation between the above-described $y_a$ and $y'_a$.

The state equation, observation equation, and error covariance matrix that are needed to use a Kalman filter are defined as described above.

Various types of methods including linear and nonlinear methods are proposed for Kalman filters. In the present embodiment, based on the fact that the state equation $f_a(x_a)$ is nonlinear as described above, an example in which a nonlinear Kalman filter is utilized is illustrated. Thereamong, an unscented Kalman filter, which does not require linearization of the state equation $f_a(x_a)$ and that has a relatively low computational load, is employed as an example. In a case in which the state equation $f_a(x_a)$ is linear, a linear Kalman filter may be used, or a nonlinear Kalman filter that is other than an unscented Kalman filter may be used.

In the present embodiment, as an example, the behavior of the vehicle 200 is estimated by using an unscented Kalman filter that is a nonlinear model. Therefore, at the position estimating section 50 that is described later, nonlinear motion such as road surface tilting also can be considered.

Generally, it is difficult to solve the nonlinearity of a model of road surface tilting (bank angle, longitudinal slope), and therefore, road surface tilting is not considered in estimating side slipping. In such a model, there is the concern that the results of estimation will deteriorate greatly at places where the road surface tilting is large. However, in the present embodiment that uses an unscented Kalman filter, the side slipping behavior (the lateral velocity) of the vehicle 200 can be estimated highly accurately by taking road surface tilting into consideration.

Figure 7:
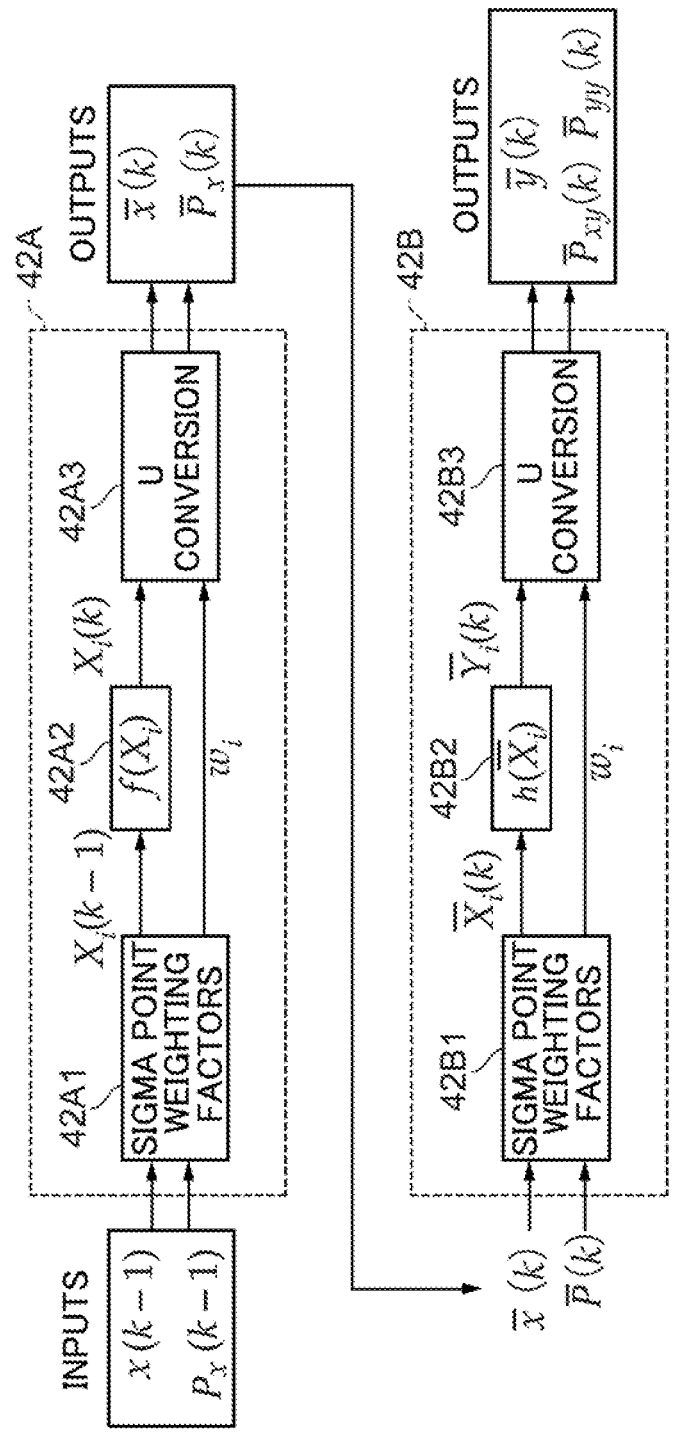
FIG. 7 is an example of a functional block drawing of a prior estimation section.

FIG. 7 is an example of a functional block drawing of the prior estimation section 42. As shown in FIG. 7, the prior estimation section 42 includes a first unscented converting section 42A and a second unscented converting section 42B.

The first unscented converting section 42A carries out unscented conversion (unscented transfer) of a first time that updates the state amounts on the basis of the state equation $f_a(x_a)$, and outputs the average of $x_a$ and the covariance matrix of $x_a$.

The second unscented converting section 42B carries out unscented conversion of a second time, which converts to corresponding observed amounts, in accordance with the observation equation $h_a(x_a)$ and by using the average of the state amounts $x_a$ and the covariance matrix of $x_a$ that are outputted by the first unscented converting section 42A.

Note that the purpose of the unscented conversion is to accurately determine the following average of the observed amounts y and covariance matrix, in conversion by a given nonlinear function $y = f(x)$.

$\bar{y}$: average of y
$\bar{P}$: covariance matrix

Accordingly, the present embodiment has the feature of approximating a probability density function by using 2n+1 samples (sigma points) corresponding to the average value and the standard deviation.

As shown in FIG. 7, the first unscented converting section 42A includes a sigma point weighting factor section 42A1, a function converting section 42A2, and a U converting section 42A3. Further, the second unscented converting section 42B includes a sigma point weighting factor section 42B1, a function converting section 42B2, and a U converting section 42B3. As shown in FIG. 6, at the attitude angle estimating section 40, the state variables are $x_a(k)$ and the state covariance is $Pn_a(k)$, and, also at the position estimating section 50 that is described later, similar processing is carried out. Therefore, in FIG. 7, FIG. 8 and the following description, the subscript a of the state variables and the subscript $n_a$ of the state covariance are omitted.

At the sigma point weighting factor section 42A1 of the first unscented converting section 42A and the sigma point weighting factor section 42B1 of the second unscented converting section 42B, the sigma points $X_i$: i=0, 1, 2, ... 2n are selected as follows. Note that the ith row in the square root matrix of $P_x$ is computed by Choelsky decomposition as an example.

$$X_o = \bar{x}$$

$$X_i = \bar{x} + \sqrt{n+\kappa}(\sqrt{P_x})_i \quad (i=1,2,3,\ldots,n)$$

$$X_{n+i} = \bar{x} - \sqrt{n+\kappa}(\sqrt{P_x})_i \quad (i=1,2,3,\ldots,n)$$

$P_x$: covariance matrix of x
$(\sqrt{P_x})_i$: ith row in square root matrix of $P_x$ Here, scaling factor $\kappa$ is selected such that $\kappa \geq 0$. Further, the weights for the sigma points are defined as follows.

$$w_0 = \frac{k}{n+k}$$

$$w_i = \frac{1}{2(n+k)}$$

$$(i = 1, 2, 3, \ldots, 2n)$$

Conversion of the respective sigma points by the nonlinear function f(x) at the function converting section 42A2 of the first unscented converting section 42A is as follows. The following is conversion by the state equation f(x) at the function converting section 42A2 of the first unscented converting section 42A. The observed values are obtained in the conversion that uses the observation equation h(x) at the function converting section 42B2 of the second unscented converting section 42B.

$$X_i(k)=f(X_i(k-1)) \ (i=1,2,\ldots,2n)$$

At the U converting section 42A3 of the first unscented converting section 42A, the average value of the state amounts x and the covariance matrix of the state amounts x are computed as follows by using the above-described weighting factors and the values which have been converted by the function f(x). Note that $Q_n$ in the following formula is the error covariance matrix.

$$\overline{x}(k) = \sum_{i=0}^{2n} w_i X_i(k)$$

$$\overline{P}_x(k) = \sum_{i=0}^{2n} w_i (X_i(k) - \overline{X}(k))(X_i(k) - \overline{X}(k))^T + Q_n$$

The following computation is carried out at the U converting section 42B3 of the second unscented converting section 42B.

$$\overline{y}(k) = \sum_{i=0}^{2n} w_i \overline{Y}_i(k)$$

$$\overline{P}_{yy}(k) = \sum_{i=0}^{2n} w_i (\overline{Y}_i(k) - \overline{y}(k))(\overline{Y}_i(k) - \overline{y}(k))^T$$

$$\overline{P}_{xy}(k) = \sum_{i=0}^{2n} w_i (\overline{X}_i(k) - \overline{x}(k))(\overline{Y}_i(k) - \overline{y}(k))^T$$

Figure 8:
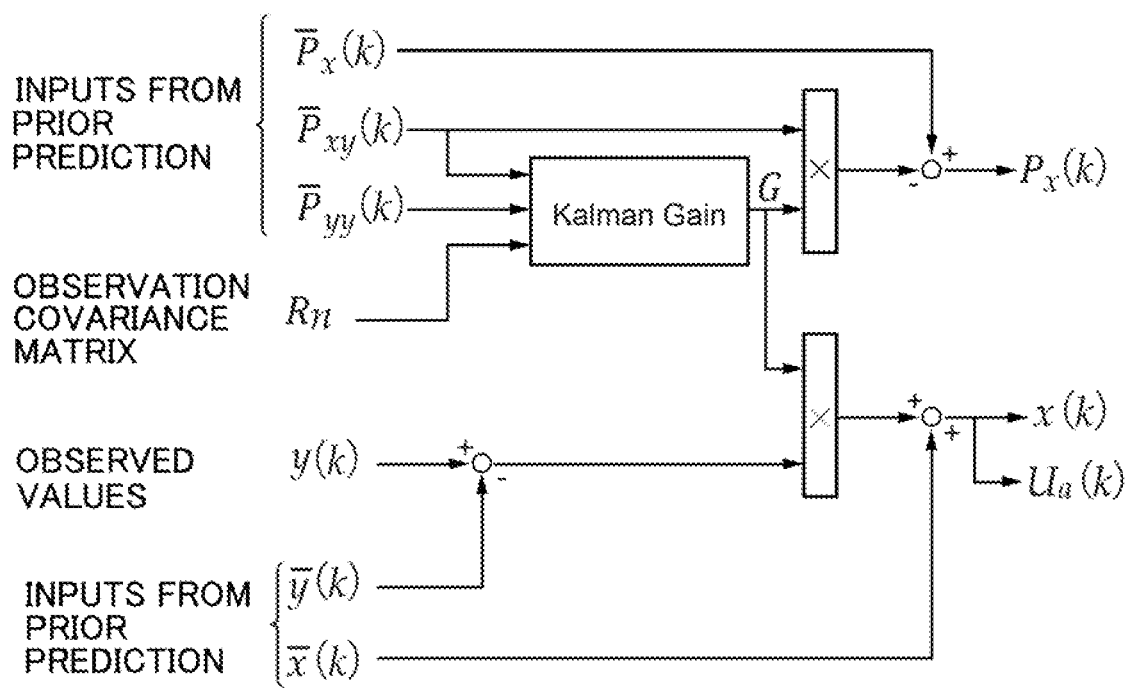
FIG. 8 is an example of a functional block drawing of a filtering section.

FIG. 8 is an example of a functional block drawing of the filtering section 44. At the filtering section 44, the differences between the observed values, which are computed by the U converting section 42B3 and correspond to the prior predicted values of the state amounts, and the observed values, which are actually observed, are compared, and processing for correcting the predicted values of the state amounts is carried out.

The processing of filtering the predicted values of the state amounts by the actually observed values is called the Kalman gain, and is computed by the following formula. Note that $R_n$ in the following formula is the observation noise.

$$G = \frac{\overline{P}_{xy}(k)}{\overline{P}_{yy}(k) + R_n}$$

Next, processing that corrects the prior predicted values of the state amounts by using this Kalman gain is carried out as follows.

$$x(k) = \overline{x}(k) + G(y(k) - \overline{y}(k))$$

$$P_x(k) = \overline{P}_x(k) - G\overline{P}_{xy}^T(k)$$

The attitude angles $u_a(k)$ are estimated by repeating the above-described processings of the prior estimation section 42 and the filtering section 44 at each time-step.

Figure 9:
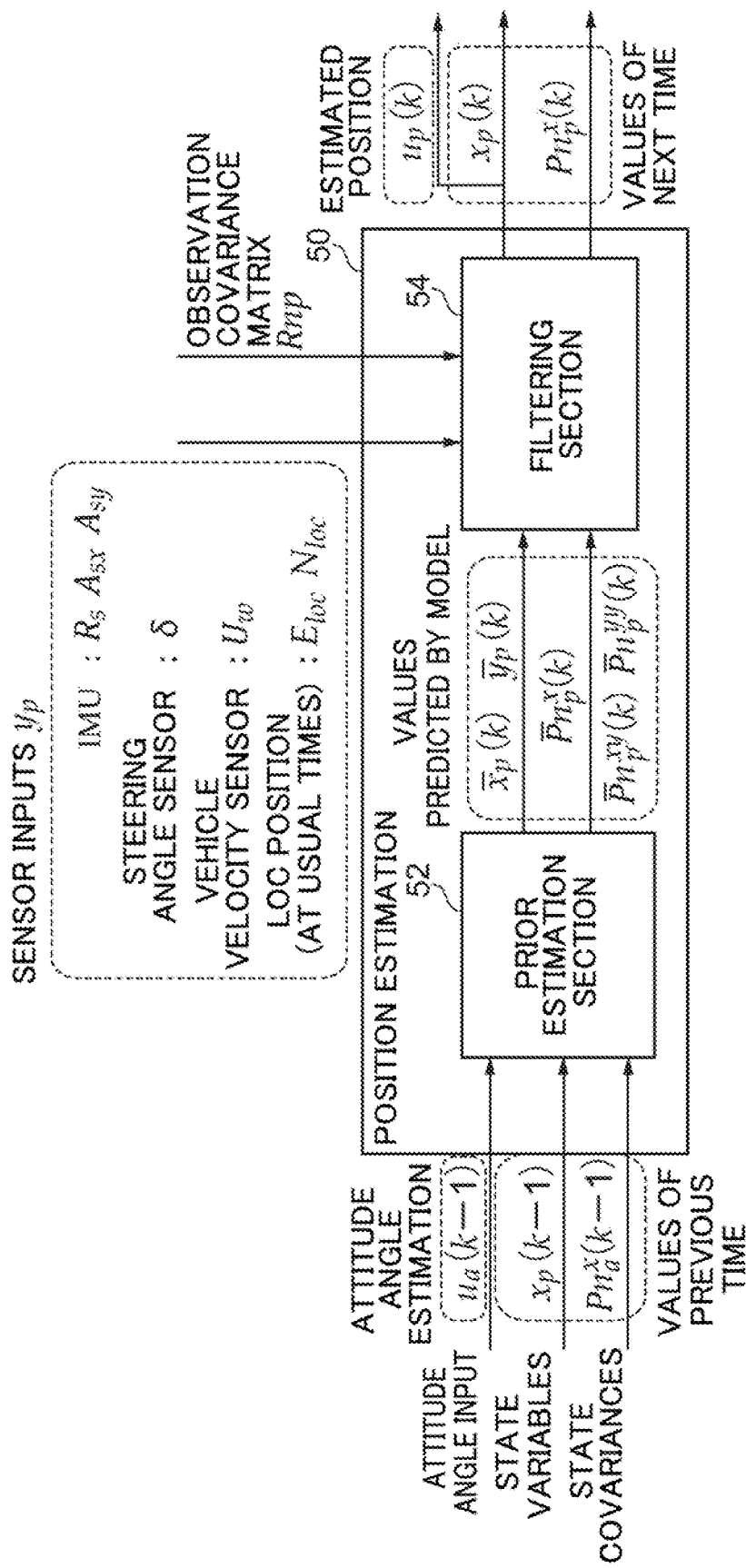
FIG. 9 is an example of a functional block drawing of a position estimating section relating to the embodiment.

The processing at the position estimating section 50 is described next. FIG. 9 is an example of a functional block drawing of the position estimating section 50 relating to the present embodiment. As shown in FIG. 9, the position estimating section 50 includes a prior estimation section 52, which estimates predicted values (prior estimated values) on the basis of a side slipping model from last time values $x_p(k-1)$ of the state variables and last time values $Pn_p^x(k-1)$ of the state covariances that are described later, and a filtering section 54, which corrects the prior estimated values outputted from the prior estimation section 52 by using the sensor inputs $y_p$ and an observation covariance matrix $Rn_p$ that is described later, and outputs next time values $x_p(k)$ of the state variables, next time values $Pn_p^x(k)$ of the state covariances, and estimated position $u_p(k)$.

Note that the subscript p of the state variables, the state covariances, the observation covariance matrix and the attitude angles is an abbreviation for place.

The object of the position estimating section 50 is to estimate position $u_p=(E_v, N_v)$ of the rear wheel axle center 200 in the vehicle body coordinate system 208. Position estimation is carried out due to steering angle $\delta_s$ and attitude angle estimated values $u_a=(\phi_v, \theta_v, \psi_v)$ being inputted, in addition to the yaw rate $R_s$, the longitudinal acceleration $A_{sx}$ and the lateral acceleration $A_{sy}$ that are detected by the IMU 26, $U_w$ that is detected by the vehicle velocity sensor, and the EN coordinates $(E_{loc}, N_{loc})$.

Generally, because the lateral velocity V of the vehicle 200 is very small, estimation by only an IMU that is mass produced by MEMS and has a large error is difficult. Thus, in the present embodiment, the lateral velocity $V_v$ of the vehicle 200 is estimated by using a vehicle motion model whose input values are steering angle $\delta_w$ and vehicle velocity $U_w$.

However, because the accuracy of a vehicle motion model depends greatly on the tire parameters, accuracy is problematic. In general estimation methods of the lateral velocity V and the yaw rate R that use the center of gravity of the vehicle 200 as the reference, the direction of the side slipping varies in the inward direction of the turn and the outward direction of the turn, in accordance with the vehicle velocity $U_w$. Further, it is assumed that the center of gravity of the vehicle 200 varies due to the load, the number of persons, and the like. Accordingly, it can be thought that, in estimation that is based on the center of gravity of the vehicle 200, the estimated direction of the side slipping is the opposite, and the position estimation may deteriorate depending on the motion model.

As described above, the present embodiment postulates a vehicle motion model in which the rear wheel axle center 202 is made to be the reference of the vehicle body coordinate system 208, and lateral velocity V always arises in the outward direction of the turn regardless of the vehicle velocity.

As described above, at a vehicle 200 in which rear wheel steering is not carried out, the rear wheel axle center 202 always has lateral velocity $V_v$ at the outer side of the turn, due to characteristics of vehicle motion. Accordingly, what is focused on here is only the relationship of the magnitude of the side slipping in accordance with the model parameters. Accordingly, as described above, in the position estimation, it is assumed that the vertical velocity $W_v=0$.

As shown in FIG. 3, a case in which side slipping is not taken into consideration is non-harmonic motion which is often utilized in the motion of robots and the like, and the position is always presumed to be at the inner side of the turn with respect to the real value. Thus, if Cp becomes small and approaches the real value $Cp_{real}$, the position estimation also will approach the real value. If Cp becomes even smaller, the position estimation will move away from the real value. From the above, by setting Cp to be large with respect to an identification value that is determined by experimentation or the like, estimation between the position of the non-harmonic motion and the real position is always possible. In such estimation, the estimating of the estimated errors in a case in which the tire parameters change due to the road surface environment or changing of the tires also is easy.

On the basis of the above, an equation of the lateral velocity V in accordance with a two-wheel model in which the origin of the coordinates is the rear wheel axle center 202 is derived.

Given that the roll angle that is a road surface attitude angle is +, and the pitch angle is $\theta_r$, the equation of motion in the lateral direction is expressed by the following formula.

$$m\left(\frac{dV_c}{dt} + R_c U_c\right) = F_y - mg \sin\phi_r \cos\theta_r$$

$F_y$ in the above is the force that works in the axial direction, and, as shown by the following formulas, is the sum of front wheel tire lateral force $F_f$ and rear wheel tire lateral force $F_r$.

$$F_y = F_f + F_r$$

The front wheel tire lateral force $F_f$ and the rear wheel tire lateral force $F_r$ are expressed by the following formulas.

$$F_f = 2K_f\left(\delta_w - \frac{V_c + l_f R_c}{U_c}\right)$$

$$F_r = 2K_r\left(-\frac{V_c - l_r R_c}{U_c}\right)$$

Figure 10:
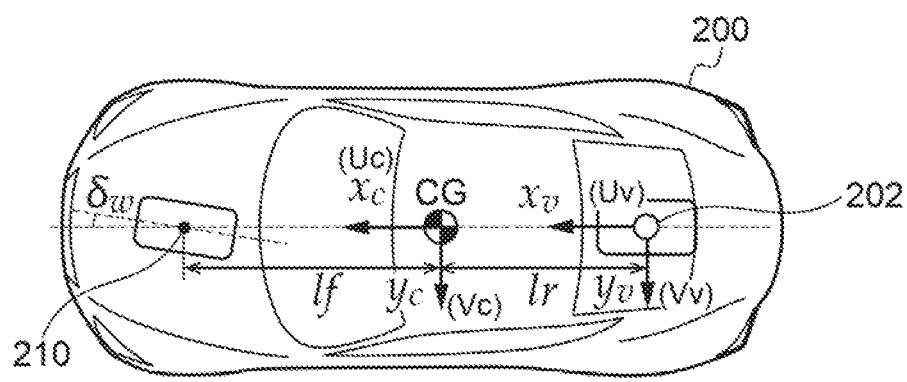
FIG. 10 is an explanatory drawing showing the relationships between longitudinal velocity and lateral velocity at the center of gravity of the vehicle, longitudinal velocity and lateral velocity at the rear wheel axle center, front wheel real steering angle, distance from the center of gravity to the front wheel axle center, and distance from the center of gravity to the rear wheel axle center.

With regard to the above formulas, the velocity around center of gravity CG of the vehicle 200 shown in FIG. 10 is $v_c = (U_c, V_c, W_c)$, the yaw rate is $R_c$, the font wheel real steering angle is $\delta_w$, the distance from the center of gravity CG to front wheel axle center 210 is $l_f$, the distance from the center of gravity CG to the rear wheel axle center 202 is $l_r$, the cornering stiffnesses of the front wheels and the rear wheels are $K_f$ and $K_r$ respectively, and the vehicle mass is m.

The formulas are rearranged by substituting the front wheel tire lateral force $F_f$ and the rear wheel tire lateral force $F_r$ in for $F_y$ in the above equation of motion.

$$\frac{dV_c}{dt} = \frac{F_y}{m} - R_c U_c - g\sin\phi_r\cos\theta_r = \frac{F_f}{m} + \frac{F_r}{m} - R_c U_c - g\sin\phi_r\cos\theta_r =$$

$$\frac{2F_f}{m}\left(\delta_w - \frac{V_c + l_f R_c}{U_c}\right) + \frac{2F_r}{m}\left(-\frac{V_c - l_r R_c}{U_c}\right) - R_c U_c - g\sin\phi_r\cos\theta_r =$$

$$-\frac{2K_f + 2K_r}{mU_c}V_c + \left(-U_c - \frac{2K_f l_f - 2K_r l_r}{mU_c}\right)R_c + \frac{2F_f}{m}\delta_w - g\sin\phi_r\cos\theta_r$$

As a result, the equation of motion of the lateral velocity is as follows.

$$\frac{dV_c}{dt} =$$

-continued $$-\frac{2K_f + 2K_r}{mU_c}V_c + \left(-U_c - \frac{2K_f l_f - 2K_r l_r}{mU_c}\right)R_c + \frac{2K_f}{m}\delta_w - g\sin\phi_r\cos\theta_r$$

The final term relating to the gravitational acceleration g in the above formula is a term that expresses the effects of gravity due to the road surface attitude angles, and is a term that is important in carrying out lateral velocity estimation. If this term is omitted, the accuracy of position estimation greatly deteriorates in particular on roads that have large banks. Upon variable-converting the above equation to the rear wheel axle center, three position vectors are considered. The relationship of the following formula is established by considering vector $r_{ew}$ from the origin of the geographical coordinate system to the rear wheel axle center, vector $r_{ec}$ from the origin of the geographical coordinate system to the vehicle center of gravity CG, and vector $r_{cw}$ from the vehicle center of gravity CG to the rear wheel axle center.

$$r_{ew} = r_{ec} + r_{cw}$$

Taking the time derivative of the above formula, because rotation angle velocity me at the center of gravity and rotation angle velocity $w_v$ at the rear axle center are the same, the formulas are rearranged as follows by using the relationship $dr/dt = \delta r/\delta t + \omega \times r$.

$$\frac{dr_{ew}}{dt} = \frac{dr_e c}{dt} + \frac{\delta r_{cw}}{\delta t} + \omega_v \times r_{cw}$$

$$= \frac{dr_e c}{dt} + \omega_v \times r_{cw}$$

$$= \begin{bmatrix} U_c \\ V_c \\ W_c \end{bmatrix} + \begin{bmatrix} 0 \\ -l_r R_v \\ l_r R_v \end{bmatrix}$$

$$\left(\frac{\delta r_{cw}}{\delta t} = 0\right)$$

As shown in FIG. 10, given that the longitudinal velocity of the rear wheel axle center 202 of the vehicle 200 is $U_v$, and the lateral velocity is $V_v$, from the above formula, the relationships $U_v = U_c$ and $V_v = V_c - l_r R_v$ are established. By using these in the equation of motion of the lateral direction, the following formula is derived.

$$\frac{dV_v}{dt} = -\frac{2K_f + 2K_r}{mU_v}V_v + \left(-U_v - \frac{2K_f l}{mU_v}\right)R_v + \frac{2K_f}{m}\delta_w - g\sin\phi_r\cos\theta_r - l_r\dot{R}_v$$

By using the above navigation equation, state equation $f_p(x_p)$ is established as follows.

In the present embodiment, state variables $x_p$ are defined as follows.

$$x_p = [E_v \, N_v \, U_v \, \dot{U}_v \, V_v \, R_v \, \dot{R}_v \, \delta_w]^T$$

Further, attitude angle input values $u_a$ that are inputted from the attitude angle estimating section 40 are defined as follows.

$$u_a = [\phi_v \, \theta_v \, \psi_v]^T$$

State equations are established as follows for the above state amounts.

$$\frac{dE_v}{dt} = U_v \cos\psi_v \cos\theta_v + V_v(\cos\psi_v \sin\theta_v \sin\phi_v - \sin\psi_v \cos\phi_v) + v_{E_v}$$

-continued $$\frac{dN_v}{dt} = U_v \sin\psi_v \cos\theta_v + V_v(\sin\psi_v \sin\theta_v \sin\phi_v + \cos\psi_v \cos\phi_v) + v_{N_v}$$

$$\frac{dU_v}{dt} = \dot{U}_v + v_{U_v}$$

$$\frac{d\dot{U}_v}{dt} = v_{\dot{U}_v}$$

$$\frac{dV_v}{dt} = -\frac{2K_f + 2K_r}{mU_v}V_v + \left(-U_v - \frac{2K_f l}{mU_v}\right)R_v + \frac{2K_f}{m}\delta_w -$$

$$g\sin\phi_r \cos\theta_r - l_r\dot{R}_v + v_{V_v}$$

$$\frac{dR_v}{dt} = \dot{R}_v + v_{R_v}$$

$$\frac{d\dot{R}_v}{dt} = v_{\dot{R}_v}$$

$$\frac{d\delta_w}{dt} = v_{\delta_w}$$

Further, in the present embodiment, system noise of the state amounts is defined as follows.

$$Q_{Np} = \text{diag}(v_{E_v} \, v_{N_v} \, v_{U_v} \, v_{\dot{U}_v} \, v_{V_v} \, v_{R_v} \, v_{\dot{R}_v} \, v_{\delta_w})$$

The derivative of the longitudinal velocity $U_v$, the derivative of the lateral velocity $V_v$, and the steering angle $\delta_w$ are made into a random walk model that is driven by white noise such that the next time values emerge randomly. A first-order Markov model may be employed for the derivative of the longitudinal velocity $U_v$, the derivative of the lateral velocity $V_v$, and the steering angle $\delta_w$.

A feature of the present embodiment is that the real steering angle also is an object of estimation. The real steering angle is not always determined at a constant ratio with respect to the steering angle $\delta_w$, and errors such as compliance and the like always arise. Such errors are not limited to white noise, but, by assuming that they are values that have a given dispersion, they can be handled by being taken-into a Kalman filter in which modeled errors that are modeled by a two-wheel model are the dispersion of the state equation.

Next, the observation matrix is defined as follows.

$$y_p = [U_w \, R_s \, A_{sx} \, A_{sy} \, \delta_s \, E_{loc} \, N_{loc}]^T$$

Observation equation $h_p(x_p)$ is defined as follows for the above observed variables.

$$U_w = U_v + \sigma_{U_w}$$

$$R_s = R_v + \sigma_{R_s}$$

$$A_{sx} = \dot{U}_v - g\sin\theta_v + \sigma_{A_{sx}}$$

$$A_{sy} = \frac{dV_u}{dt} + RU + g\sin\phi_v \cos\theta_v + \sigma_{A_{sy}}$$

$$\delta_s = \epsilon_{sw}\delta_w + \sigma_{\delta_s}$$

$$E_{loc} = E_v + \sigma_{E_{loc}}$$

$$N_{loc} = N_v + \sigma_{N_{loc}}$$

$\epsilon_{sw}$ in the above formula is the ratio between the real steering angle and the steering angle, and is assumed to be a steady-state value here, but it is also possible to use a mapped value therefor. Further, $dV_v/dt$ is omitted because a formula that is similar to the state equation is used. Because this value is relatively small and is hidden by noise and errors of the acceleration sensor, there is little effect on the accuracy of position estimation even if this value is excluded from the observation equation.

The error covariance matrix of the observation equation is defined as follows.

$$R_{Np} = \text{diag}(\sigma_{U_w} \, \sigma_{R_s} \, \sigma_{A_{sx}} \, \sigma_{A_{sy}} \, \sigma_{\beta_s} \, \sigma_{E_{loc}} \, \sigma_{N_{loc}})$$

Because the EN coordinates cannot be acquired during inertial navigation in which external sensors cannot be used, the observed variables are changed as follows.

$$y_p = [U_w \, R_s \, A_{sx} \, A_{sy} \, \delta_s]^T$$

For the observation equation, it suffices to use an equation that excludes formulas that respectively express $E_{loc}$ and $N_{loc}$ that relate to the EN coordinates. There is no particular need to carry out initialization or the like on the values of the state variables and on the covariance matrix, and it suffices to use a combination of a method for usual times and an inertial navigation method by changing the observation equation.

As described above, the position estimating section 50 includes the prior estimation section 52, which estimates predicted values (prior estimated values) on the basis of a side slipping model from the last time values $x_p(k-1)$ of the state variables and the last time values $Pn_p{}^x(k-1)$ of the state covariances, and the filtering section 54, which corrects the prior estimated values outputted from the prior estimation section 52 by using the sensor inputs $y_p$ and the observation covariance matrix $Rn_p$ that is described later, and outputs the next time values $x_p(k)$ of the state variables, the next time values $Pn_p{}^x(k)$ of the state covariances, and the estimated position $u_p(k)$.

In the same way as the prior estimation section 42 of the attitude angle estimating section 40, the prior estimation section 52 of the position estimating section 50 includes a first unscented converting section and a second unscented converting section such as shown in FIG. 7.

The first unscented converting section of the position estimating section 50 carries out unscented conversion of a first time that updates the state amounts of the basis of the state equation $f_p(x_p)$, and outputs the average of $x_p$ and a covariance matrix of $x_p$.

The second unscented converting section of the position estimating section 50 carries out unscented conversion of a second time, which converts to corresponding observed amounts, in accordance with the observation equation $h_p(x_p)$ and by using the average of the state amounts $x_p$ and the covariance matrix of the state amounts $x_p$ that are outputted by the first unscented converting section.

In the same way as the filtering section 44 of the attitude angle estimating section 40, the filtering section of the position estimating section 50 compares the differences between the observed values corresponding to the prior predicted values of the state amounts and the observed values that are actually observed, and carries out processing that corrects the predicted values of the state amounts.

Thereinafter, in the same way as at the attitude angle estimating section 40, by repeating the processings of the prior estimation section 52 and the filtering section 54 each time-step, the longitudinal velocity $U_v$, the lateral velocity $V_v$ and the yaw rate $R_v$ of the vehicle 200 are respectively estimated. Further, the position (the EN coordinates) of the vehicle 200 immediately before this estimation is used as the initial value of the position of the vehicle 200, and the current position of the vehicle 200 is estimated on the basis of this initial value, and the attitude angles (the pitch angle $\theta_v$, the roll angle $\phi_v$, the yaw angle $\psi_v$) of the vehicle 200 that are estimated at the attitude angle estimating section 40, and the estimated longitudinal velocity $U_v$, lateral velocity $V_v$ and yaw rate $R_v$.

As an example, as shown in FIG. 11, the calculation unit 14 includes a CPU (Central Processing Unit 61), a primary storage section 62, a secondary storage section 63 and an external interface 64. The CPU 61 is an example of a processor that is hardware. The CPU 61, the primary storage section 62, the secondary storage section 63 and the external interface 64 are connected to one another via a bus 69.

The primary storage section 62 is, for example, a volatile memory such as a RAM (Random Access Memory) or the like. The secondary storage section 63 is, for example, a non-volatile memory such as an HDD (Hard Disk Drive), an SSD (Solid State Drive) or the like.

The secondary storage section 63 includes a program storage area 63A and a data storage area 63B. As an example, the program storage area 63A stores programs such as a computing program and the like. As an example, the data storage area 63B stores intermediate data that is generated at the time of executing the computing program, and the like.

The CPU 61 reads-out the computing program from the program storage area 63A, and expands it in the primary storage section 62. Due to the CPU 61 loading and executing the computing program, the CPU 61 functions as the calculation unit 14 of FIG. 1, i.e., the attitude angle estimating section 40 and the position estimating section 50 of FIG. 5A and FIG. 5B, the prior estimation section 42 and the filtering section 44 of FIG. 6, and the prior estimation section 52 and the filtering section 54 of FIG. 9.

Note that the programs such as the computing program and the like may be stored on an external server, and expanded in the primary storage section 62 via a network. Further, the programs such as the computing program and the like may be stored on a non-transitory storage medium such as a DVD (Digital Versatile Disc) or the like, and may be expanded in the primary storage section 62 via a storage medium reading device.

External devices are connected to the external interface 64, and the external interface 64 governs the transmitting and receiving of various types of information between the external devices and the CPU 61. As shown as an example in FIG. 1, the external interface 64 is connected to the storage device 18, the input device 12 and the display device 16. The storage device 18, the input device 12 and the display device 16 are examples, and other devices may be connected to the external interface 64.

Although the CPU is given as an example of the processor, the processor is not limited to a CPU. For example, the processor may be a Programmable Logic Device (PLD) whose circuit structure can be changed after production such as an Field-Programmable Gate Array (FPGA) or the like, or may be a Graphics Processing Unit (GPU) or the like. One of these various types of processors may be used alone, or two or more processors of the same type or different types may be used in combination.

As described above, in accordance with the inertial navigation device 10 relating to the present embodiment, by using the results of output of the IMU 26 and the vehicle velocity sensor 24 respectively, the attitude angles (the pitch angle $\theta_v$, the roll angle $\phi_v$, the yaw angle $\psi_v$) of the vehicle 200 are estimated, and the position of the vehicle 200 is estimated by using the estimated attitude angles and the respective results of output of the IMU 26, the vehicle velocity sensor 24 and the steering angle sensor 28. The IMU 26, the vehicle velocity sensor 24 and the steering angle sensor 28 are internal sensors that sense states of the vehicle 200 itself.

Accordingly, in accordance with the inertial navigation device 10 relating to the present embodiment, in a case of disruption of information from external sensors such as a GPS and the like that sense the external situation, the position of the own vehicle can be estimated on the basis of the accumulation of movement amounts of the own vehicle that are detected by internal sensors.

As described above, the inertial navigation device 10 relating to the present embodiment utilizes the feature that, at the vehicle 200 that is traveling on a road, the vertical velocity $W_v$ and the lateral velocity $V_v$ are small, and assumes four degrees of freedom (vertical velocity $W_v$=lateral velocity $V_v$=0) in the attitude angle estimation, and assumes five degrees of freedom (vertical velocity $W_v$=0) in the position estimation, and reduces the number of dimensions. Due thereto, even if the IMU 26 that is an inertial sensor is not highly accurate, or even if the accuracy of the IMU 26 deteriorates, the attitude angles of the vehicle 200 and the position of the vehicle 200 can be estimated stably.

Further, in the inertial navigation device 10 relating to the present embodiment, by making a point at which the side slipping is always in the outward direction of the turn be the reference point of the side slipping model, the phenomenon of the direction of the side slipping varying depending on the vehicle velocity even if the turning direction is the same, cannot arise as is the case in a vehicle motion model that uses the vehicle center of gravity position CG as the reference. As a result, in the inertial navigation device 10 relating to the present embodiment, accompanying the highly accurate estimation of the magnitude of the side slipping of the vehicle 200, the position of the vehicle 200 can be estimated highly accurately regardless of the vehicle velocity.

Further, the inertial navigation device 10 relating to the present embodiment estimates the behavior of the vehicle 200 by using an unscented Kalman filter that is a nonlinear model. Therefore, it is possible to also take into consideration nonlinear motion such as road surface tilting, and, as a result, the side slipping behavior of the vehicle 200 that takes road surface tilting into consideration can be estimated highly accurately.

An object of the present disclosure is to realize an inertial navigation device that, in a case in which information from external sensors is disrupted, estimates the position of the own vehicle on the basis of the accumulation of movement amounts of the own vehicle that are detected by internal sensors.

A first aspect of the present disclosure is an inertial navigation device that includes: an inertial measurement device that can detect angular velocities and accelerations that express behavior of a vehicle at a time of traveling; a vehicle velocity sensor that detects a longitudinal velocity of the vehicle; a steering angle sensor that detects a steering angle of the vehicle; and a processor that is configured to: assume a vertical velocity and a lateral velocity of the vehicle to be 0, and estimate a roll angle, a pitch angle and an azimuth angle, which are attitude angles of the vehicle, based on the angular velocities detected by the inertial measurement device, the accelerations detected by the inertial measurement device, the longitudinal velocity detected by the vehicle velocity sensor, and an initial value of the azimuth angle of the vehicle, and assume the vertical velocity of the vehicle to be 0, and estimate a current position of the vehicle based on the estimated attitude angles, the angular velocities detected by the inertial measurement device, the accelerations detected by the inertial measurement device, the longitudinal velocity detected by the vehicle velocity sensor, the steering angle detected by the steering angle sensor, and an initial value of a position of the vehicle.

A second aspect of the present disclosure is the inertial navigation device of the first aspect, wherein: the inertial measurement device can detect angular velocities of three axes that are a pitch rate, a roll rate and a yaw rate, and accelerations of three axes that are a longitudinal acceleration, a lateral acceleration and a vertical acceleration; and the processor is configured to: estimate the attitude angles of the vehicle by using angular velocities of three axes that are the pitch rate, the roll rate and the yaw rate detected by the inertial measurement device, and accelerations of two axes that are the longitudinal acceleration and the lateral acceleration detected by the inertial measurement device, and estimate the current position of the vehicle by using the yaw rate that is an angular velocity of one axis detected by the inertial measurement device, and the longitudinal acceleration and the lateral acceleration that are accelerations of two axes detected by the inertial measurement device, and the attitude angles.

A third aspect of the present disclosure is the inertial navigation device of the first aspect, wherein the processor is configured to, by using an equation of motion of lateral velocity in which a position at which a lateral velocity of the vehicle occurs in an outward direction of a turn is used as a reference position regardless of a longitudinal velocity at a time of turning of the vehicle, estimate an acceleration at the reference position and the current position of the vehicle.

A fourth aspect he of the present disclosure is the inertial navigation device of the third aspect, wherein the reference position is a position of wheels of the vehicle that do not have a steering function.

A fifth aspect of the present disclosure is the inertial navigation device of the fourth aspect, wherein the reference position is a vehicle transverse direction center of an axle of wheels of the vehicle that do not have a steering function.

A sixth aspect of the present disclosure is the inertial navigation device of the first aspect, wherein the lateral velocity of the vehicle is estimated based on effects of a bank angle of a road surface and a longitudinal slope of the road surface, by a vehicle motion model that uses information of the attitude angles.

A seventh aspect of the present disclosure is the inertial navigation device of the third aspect, wherein: based on a formula that expresses a relationship between motion of the vehicle and the accelerations detected by the inertial measurement device, state amounts of the vehicle at a next time are predicted from state amounts of the vehicle that include attitude angles of the vehicle and that have been estimated at a previous time, the predicted state amounts of the vehicle are corrected based on the vehicle longitudinal velocity, the angular velocities of the vehicle and the accelerations of the vehicle, which correspond to the predicted state amounts of the vehicle of the next time and which are calculated by using a predetermined observation equation, and based on differences between these respective calculated values and corresponding actually measured values thereof, and the state amounts of the vehicle that have been estimated at the previous time, based on the estimated attitude angles, and a formula that expresses a relationship between motion of the vehicle and the accelerations which formula includes a reference position at which a lateral velocity of the vehicle occurs in an outward direction of a turn regardless of a longitudinal velocity at a time of turning of the vehicle, state amounts of the vehicle of the next time are predicted from state amounts of the vehicle that include the position of the vehicle and the velocities, accelerations and angular velocities that have been estimated at the previous time, and the predicted state amounts of the vehicle are corrected, based on the vehicle longitudinal velocity, the angular velocities of the vehicle, the accelerations of the vehicle and the position of the vehicle, which correspond to the predicted state amounts of the vehicle of the next time and which are calculated by using a predetermined observation equation, and based on differences between these respective calculated values and corresponding actually measured values thereof, and the state amounts of the vehicle that have been estimated at the previous time.

In accordance with the present disclosure, in a case in which information from external sensors is disrupted, the position of the own vehicle can be estimated on the basis of the accumulation of movement amounts of the own vehicle that are detected by internal sensors.

What is claimed is:

1. An inertial navigation device comprising:
    an inertial measurement device, including a gyro sensor, that detects an angular velocity and an acceleration of a vehicle in different coordinate directions during traveling of the vehicle;
    a vehicle velocity sensor that detects a longitudinal velocity of the vehicle;
    a steering angle sensor that detects a steering angle of the vehicle; and
    a processor that, in response to determining a failure of one or more external sensors of the vehicle, is configured to:
        perform a first vehicle position calculation process by setting a vertical velocity and a lateral velocity of the vehicle to be 0, and calculating a roll angle, a pitch angle, and an azimuth angle, which are attitude angles of the vehicle, the attitude angles of the vehicle being calculated based on the angular velocities detected by the inertial measurement device, the accelerations detected by the inertial measurement device, the longitudinal velocity detected by the vehicle velocity sensor, and an initial value of the azimuth angle of the vehicle,
        perform a second vehicle position calculation process by setting only the vertical velocity of the vehicle to be 0, and calculating a current position of the vehicle based on the calculated attitude angles, the angular velocities detected by the inertial measurement device, the accelerations detected by the inertial measurement device, the longitudinal velocity detected by the vehicle velocity sensor, the steering angle detected by the steering angle sensor, and an initial value of a position of the vehicle, and
        operate at least one driving assistance system of the vehicle based on the calculated attitude angles and the calculated position of the vehicle upon determining the failure of one or more external sensors of the vehicle, which are different than the inertial measurement device, the vehicle velocity sensor, and the steering angle sensor, and the one or more external sensors include at least one of a Global Positioning System (GPS) device, an imaging sensor, Light Detection and Ranging (LIDAR), and sonar, which are configured to detect at least a location or an environment of the vehicle.

2. The inertial navigation device of claim 1, wherein:
    the inertial measurement device is configured to detect angular velocities of three axes that are a pitch rate, a roll rate and a yaw rate, and accelerations of three axes that are a longitudinal acceleration, a lateral acceleration and a vertical acceleration; and the processor is configured to:

calculate the attitude angles of the vehicle by using the angular velocities of the three axes that are the pitch rate, the roll rate and the yaw rate detected by the inertial measurement device, and the accelerations of two of the three axes that are the longitudinal acceleration and the lateral acceleration detected by the inertial measurement device, and calculate the current position of the vehicle by using the yaw rate that is an angular velocity of one axis detected by the inertial measurement device, and the longitudinal acceleration and the lateral acceleration that are accelerations of the two axes detected by the inertial measurement device, and the attitude angles.

3. The inertial navigation device of claim 1, wherein the processor is configured to, by using an equation of motion of lateral velocity in which a position at which a lateral velocity of the vehicle occurs in an outward direction of a turn is used as a reference position regardless of a longitudinal velocity at a time of turning of the vehicle, calculate an acceleration at the reference position and the current position of the vehicle.

4. The inertial navigation device of claim 3, wherein the reference position is a position of wheels of the vehicle that do not have a steering function.

5. The inertial navigation device of claim 4, wherein the reference position is a vehicle transverse direction center of an axle of the wheels of the vehicle that do not have the steering function.

6. The inertial navigation device of claim 3, wherein:

based on a formula that expresses a relationship between motion of the vehicle and the accelerations detected by the inertial measurement device, state amounts of the vehicle at a next time are predicted from state amounts of the vehicle that include attitude angles of the vehicle and that have been calculated at a previous time, the predicted state amounts of the vehicle are corrected based on the vehicle longitudinal velocity, the angular velocities of the vehicle and the accelerations of the vehicle, which correspond to the predicted state amounts of the vehicle of the next time and which are calculated by using a predetermined observation equation, and based on differences between these respective calculated values and corresponding actually measured values thereof, and the state amounts of the vehicle that have been calculated at the previous time, based on the calculated attitude angles, and a formula that expresses a relationship between motion of the vehicle and the accelerations which formula includes a reference position at which a lateral velocity of the vehicle occurs in an outward direction of a turn regardless of a longitudinal velocity at a time of turning of the vehicle, state amounts of the vehicle of the next time are predicted from state amounts of the vehicle that include the position of the vehicle and the velocities, accelerations and angular velocities that have been calculated at the previous time, and the predicted state amounts of the vehicle are corrected, based on the vehicle longitudinal velocity, the angular velocities of the vehicle, the accelerations of the vehicle and the position of the vehicle, which correspond to the predicted state amounts of the vehicle of the next time and which are calculated by using a predetermined observation equation, and based on differences between these respective calculated values and corresponding actually measured values thereof, and the state amounts of the vehicle that have been calculated at the previous time.

7. The inertial navigation device of claim 1, wherein the lateral velocity of the vehicle is calculated based on effects of a bank angle of a road surface and a longitudinal slope of the road surface, by a vehicle motion model that uses information of the attitude angles.

8. An inertial navigation method comprising:

by a processor, performing a first vehicle position calculation process by setting a vertical velocity and a lateral velocity of a vehicle to be 0, and calculating a roll angle, a pitch angle, and an azimuth angle that are attitude angles of the vehicle, an angular velocity and an acceleration of the vehicle being detected by an inertial measurement device, including a gyro sensor, in different coordinate directions during traveling of the vehicle, the attitude angles of the vehicle being calculated based on the angular velocities and the accelerations detected by the inertial measurement device, a longitudinal velocity of the vehicle that is detected by a vehicle velocity sensor, and an initial value of the azimuth angle of the vehicle;

performing a second vehicle position calculation process by setting only the vertical velocity of the vehicle to be 0, and calculating a current position of the vehicle, based on the calculated attitude angles, the angular velocities and the accelerations detected by the inertial measurement device, the longitudinal velocity detected by the vehicle velocity sensor, a steering angle of the vehicle detected by a steering angle sensor, and an initial value of a position of the vehicle; and operating at least one driving assistance system of the vehicle based on the calculated attitude angles and the calculated position of the vehicle upon determining the failure of one or more external sensors of the vehicle, which are different than the inertial measurement device, the vehicle velocity sensor, and the steering angle sensor, and the one or more external sensors include at least one of a Global Positioning System (GPS) device, an imaging sensor, Light Detection and Ranging (LIDAR), and sonar, which are configured to detect at least a location or an environment of the vehicle.

9. The inertial navigation method of claim 8, wherein:

the inertial measurement device is configured to detect angular velocities of three axes that are a pitch rate, a roll rate and a yaw rate, and accelerations of three axes that are a longitudinal acceleration, a lateral acceleration and a vertical acceleration;

the processor is configured to calculate the attitude angles of the vehicle by using the angular velocities of the three axes that are the pitch rate, the roll rate, and the yaw rate, and the accelerations of two of the three axes that are the longitudinal acceleration and the lateral acceleration, which are detected by the inertial measurement device; and the processor is configured to calculate the current position of the vehicle by using the yaw rate that is an angular velocity of one axis, and the longitudinal acceleration and the lateral acceleration that are accelerations of the two axes, which are detected by the inertial measurement device, and the attitude angles.

10. The inertial navigation method of claim 8, wherein acceleration at a reference position, and the current position of the vehicle, are calculated by using an equation of motion of lateral velocity in which the reference position is a position at which a lateral velocity of the vehicle occurs in an outward direction of a turn regardless of a longitudinal velocity at a time of turning of the vehicle.

11. The inertial navigation method of claim 10, wherein the reference position is a position of wheels of the vehicle that do not have a steering function.

12. The inertial navigation method of claim 11, wherein the reference position is a vehicle transverse direction center of an axle of the wheels of the vehicle that do not have the steering function.

13. The inertial navigation method of claim 10, wherein:
based on a formula that expresses a relationship between motion of the vehicle and the accelerations detected by the inertial measurement device, state amounts of the vehicle at a next time are predicted from state amounts of the vehicle that include attitude angles of the vehicle and that have been calculated at a previous time;
the predicted state amounts of the vehicle are corrected based on the vehicle longitudinal velocity, the angular velocities of the vehicle and the accelerations of the vehicle, which correspond to the predicted state amounts of the vehicle of the next time and which are calculated by using a predetermined observation equation, and based on differences between these respective calculated values and corresponding actually measured values thereof, and the state amounts of the vehicle that have been calculated at the previous time;
based on the calculated attitude angles and a formula that expresses a relationship between motion of the vehicle and the accelerations which formula includes a reference position at which a lateral velocity of the vehicle occurs in an outward direction of a turn regardless of a longitudinal velocity at a time of turning of the vehicle, state amounts of the vehicle of the next time are predicted from state amounts of the vehicle that include the position of the vehicle and the velocities, accelerations and angular velocities that have been calculated at the previous time; and
the predicted state amounts of the vehicle are corrected based on the vehicle longitudinal velocity, the angular velocities of the vehicle, the accelerations of the vehicle and the position of the vehicle, which correspond to the predicted state amounts of the vehicle at the next time and which are calculated by using a predetermined observation equation, and based on differences between these respective calculated values and corresponding and actually measured values thereof, and the state amounts of the vehicle that have been calculated at the previous time.

14. The inertial navigation method of claim 8, wherein the lateral velocity of the vehicle is calculated based on effects of a bank angle of a road surface and a longitudinal slope of the road surface, by a vehicle motion model that uses information of the attitude angles.

* * * * *